United States Patent [19]
Lally

[11] 3,876,447
[45] Apr. 8, 1975

[54] METHOD OF APPLYING HARD-FACING MATERIALS

[75] Inventor: Frank T. Lally, Willowick, Ohio

[73] Assignee: TRW Inc., Cleveland, Ohio

[22] Filed: June 22, 1973

[21] Appl. No.: 372,824

[52] U.S. Cl.............. 117/22; 117/46 CA; 29/423; 29/500; 164/97
[51] Int. Cl............................ C23c 5/00; B22f 3/00
[58] Field of Search ......... 29/423, 424, 471.1, 500, 29/501; 164/97; 117/22, 46 CA

[56] References Cited
UNITED STATES PATENTS

| | | | |
|---|---|---|---|
| 2,260,593 | 10/1941 | Wittlinger et al.................... | 164/97 |
| 2,979,793 | 4/1961 | Wilson et al......................... | 164/97 |
| 3,024,128 | 3/1962 | Dawson et al............... | 117/46 CA X |
| 3,399,070 | 8/1968 | Scharf.............................. | 117/22 X |
| 3,513,013 | 5/1970 | Willis et al........................ | 29/501 X |
| 3,741,788 | 6/1973 | Sheinhurtz........................ | 117/22 X |

Primary Examiner—Al Lawrence Smith
Assistant Examiner—K. J. Ramsey
Attorney, Agent, or Firm—Hill, Gross, Simpson, Van Santen, Steadman, Chiara & Simpson

[57] ABSTRACT

Method for applying hard-facing materials to metal substrates through the use of a composite mat consisting of a laminate of two sheets of pliable material. Each of the sheets contains a network of polytetrafluoroethylene fibers which are biaxially oriented. One of the sheets contains particles of a hard-facing material while the other contains particles of a brazing alloy. The laminated sheets are applied to the surface and then the resulting assembly is heated to a brazing temperature whereupon the polytetrafluoroethylene is volatilized and the brazing alloy is melted, producing a dispersion of the hard-facing material particles in a matrix of brazing alloy securely bonded to the substrate. The sheets are prepared by making a slurry of polytetrafluoroethylene particles and hard-facing particles or brazing alloy particles, as the case may be, in combination with a volatile liquid vehicle. After draining off excess vehicle, the resulting limp sheet is subjected to a rolling pressure in two mutually perpendicular directions to thereby fibrillate the resin particles to produce a biaxially oriented network of polytetrafluoroethylene fibers in which the metallic particles are dispersed. A sheet containing the hard-facing particles is then laminated to a similar sheet containing brazing particles. The resulting laminate is then cut to size and applied to the surface of the substrate.

8 Claims, 8 Drawing Figures

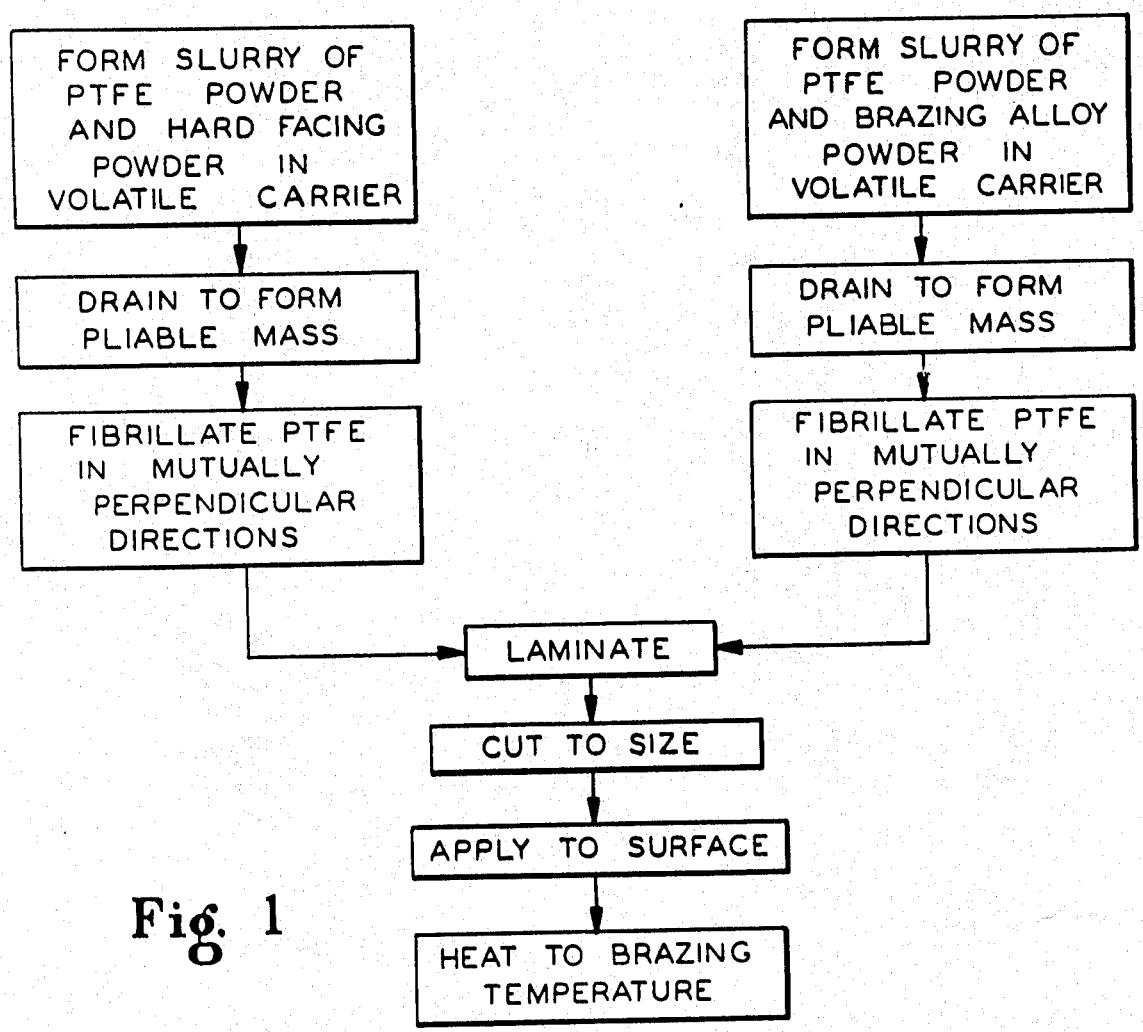
Fig. 1
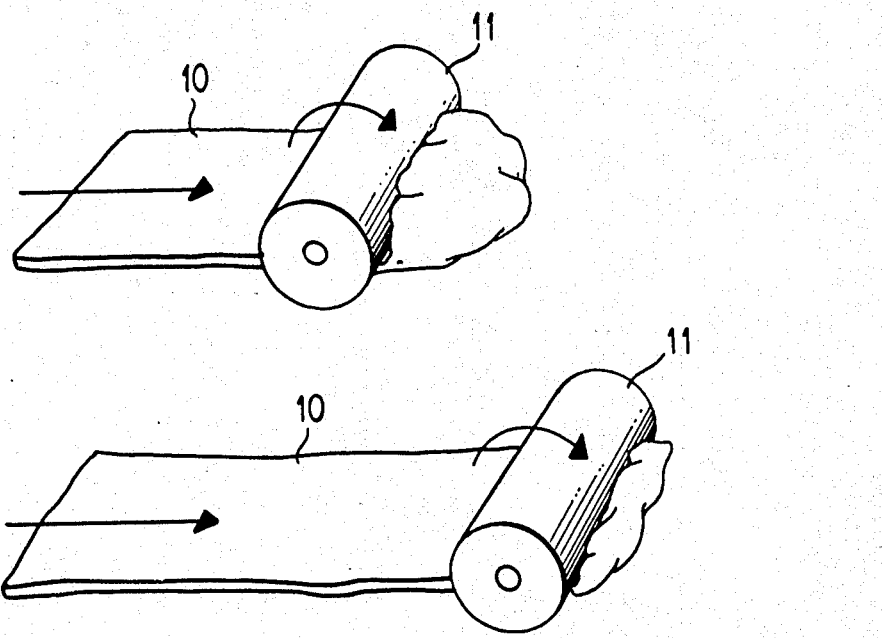
Fig. 2A
Fig. 2B

METHOD OF APPLYING HARD-FACING MATERIALS

BACKGROUND OF THE INVENTION

1. Field of the Invention

This invention is in the field of applying hard-facing materials to substrates and involves the use of a laminated sheet material which can be applied in discrete areas with any configuration desired.

2. Description of the Prior Art

Hard-facing materials or oxidation protection coatings are frequently applied to valves or gas turbine engine components by means of a plasma spray or a flame spray coating process. Both of these methods result in coatings which contain significant amounts of porosity and evidence relatively low bond strengths on the order of 5,000 pounds per square inch. In addition, these coating processes require facilities which do not lend themselves to production line processing and they usually require extensive precautions to protect personnel from harmful rays and excessive noise. The two processes also have the disadvantage that there is an unavoidably large amount of overspray and thus inefficient use of the hard-facing materials.

SUMMARY OF THE INVENTION

The method of the present invention involves applying to the surface of the substrate a mat of biaxially oriented polytetrafluoroethylene (PTFE) fibers containing particles of a hard-facing material bonded to a mat of biaxially oriented PTFE fibers containing particles of a brazing alloy, and heating the laminate to a brazing temperature at which the brazing alloy melts, to thereby volatilize the PTFE and form a coating containing discrete particles of the hard-facing material in a continuous matrix of brazing alloy bonded to the substrate.

The laminate is prepared by forming a slurry of PTFE powder and hard-facing powder in a volatile solvent. After draining to form a pliable mass, the mass is fibrillated in mutually perpendicular directions by applying a rolling pressure to the mass in such directions. The result is a biaxially oriented sheet of PTFE in which the hard-facing powder particles are embedded.

A biaxially oriented sheet containing brazing alloy particles is produced in the same manner as the sheet containing the hard-facing powder. The two sheets are then laminated together by means of slight heat and pressure to form a composite sheet which can be cut to any size or geometry desired. The cut segments are then applied to the surface and heated to a brazing temperature which, of course, is below the melting temperature of the substrate and of the hard-facing particles. The temperature is high enough, however, to volatilize off the PTFE, leaving a fully dense coating consisting usually of about 80 to 85% by volume of the hard-facing particles and 15 to 20% by volume of the brazing material.

The invention is applicable to all types of brazing alloys and hard-facing particles. Any metal, metal carbide, metal nitride or other metal compound which provides a harder surface than the substrate to be coated can be suitably used in the process. Chromium carbide and tungsten carbide are particularly preferred. Metal oxides are not particularly desirable as they are difficult to wet by the brazing metals. Alloys can also be used as hard-facing materials in the new process. Such hard-facing alloys can be low alloy ferrous materials, high alloy ferrous materials, nickel base alloys and cobalt base alloys. For specific compositions within these classes, reference is invited to the Metals Handbook, Eighth Edition, Volume 1, pages 820 to 833.

The choice of suitable brazing alloys will be governed by the nature of the underlying substrate and the invention is applicable to any of the commonly used brazing alloys which are compatible with the substrates on which they are to be applied and do not evidence substantial solubility for the hard-facing particles employed. The brazing conditions are the same as those ordinarily employed for the particular brazing alloy and the substrate.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a flow chart setting forth the specific steps involved in producing the laminate and applying it to the surface to be hard faced;

FIGS. 2A through 2E are somewhat diagrammatic showings of the method of fibrillating the sheets containing PTFE, with the thickness of the sheets being exaggerated for purposes of clarity;

DESCRIPTION OF THE PREFERRED EMBODIMENTS

Referring to FIG. 1, the first step of the process consists in forming a slurry of PTFE powder and a hard-facing powder in a liquid carrier. The liquid carrier may consist of materials such as mineral spirits, Stoddard solvent or other hydrocarbon liquids. The function of the liquid carrier is to lubricate the mass and to soften up the PTFE powder for the subsequent fibrillation of the PTFE. The proportions of the carrier are not at all critical, but normally about 4 to 5 volumes of the hydrocarbon will be used for every volume of PTFE powder.

The slurry contains a large excess of the hard-facing particles compared to the PTFE as the amount of hard-facing material in the solids of the slurry may constitute 90% and more, with values of 97 to 99½% by weight being typical. The PTFE particles constitute the remaining 10% or less of the solids of the slurry, and usually about ½ to 3% by weight.

The slurry should be made up under conditions of high shear agitation as by use of a blender. The mixing is carried out for periods of time ranging from about 1 to 20 minutes to insure thorough wetting and uniform distribution of the solid particles in the slurry.

After the slurry is formed, it is drained as by means of a filter to produce a pliable mass in the form of a wet cake which can be conveniently handled. At this stage of the process, the wet cake may have a concentration of liquid carrier on the order of 15 to 25% by weight The next step in the process consists in fibrillating the PTFE of the pliable mass in mutually perpendicular directions. This is a technique which has been developed by the du Pont Company and is identified as their HS-10 method. A complete disclosure of the fibrillating method will be found in Du Pont British Pat. No. 1,049,328 which is hereby incorporated in the specification by reference.

Figure 2C:
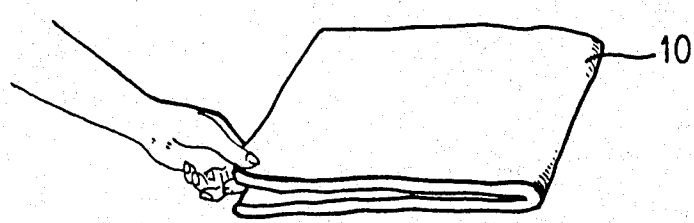
Figure 2D:
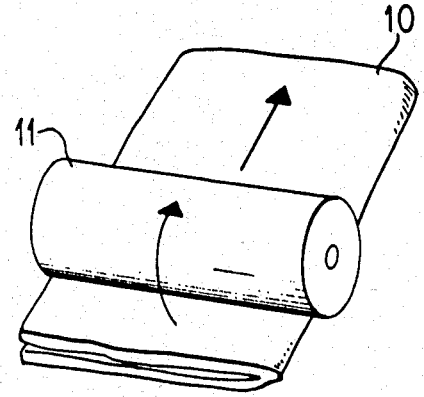
Figure 2E:
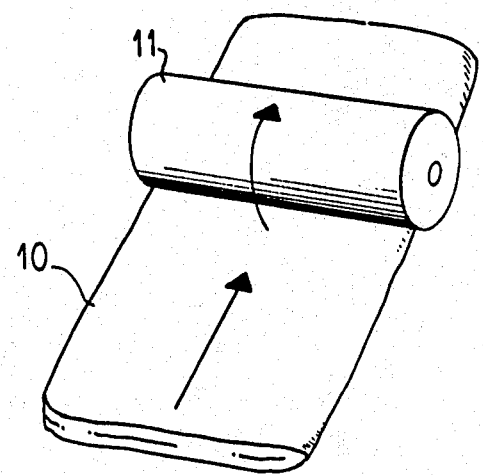

The basic steps of the fibrillating method are illustrated in FIGS. 2A through 2E of the drawings. FIG. 2A illustrates a pliable mass 10 which is subjected to rolling pressure by means of a roller 11 in a lengthwise direction. Typical rolling pressures are about 50 to 150 psi. As illustrated in FIG. 2B, the rolling causes the mass 10 to be flattened out substantially into an elongated sheet. Following the longitudinal rolling, as illustrated in FIG. 2C, the resulting sheet is folded lengthwise and then the rolling is resumed in the transverse direction as illustrated in FIG. 2D. The sheet is then rolled repeatedly in the transverse direction to produce an elongated sheet which is biaxially oriented and which securely holds the hard-facing particles within its interstices. The thickness of the sheet shown in FIGS. 2A to 2E has been exaggerated for purposes of illustration, and the normal thickness is less than 1/10 of an inch and usually is about 0.030 inch at the conclusion of the rolling operation. During the rolling operation, additional amounts of the liquid carrier can be sprayed onto the mass as needed to maintain workability. The sheet resulting from the rolling operation is a limp, cloth-like mat which is readily handleable.

Returning to FIG. 1, it will be seen that the same type of process is used to form a limp sheet of biaxially oriented PTFE containing brazing alloy powder. In fact, the proportions of metal to PTFE and all other variables can be the same as in the production of the sheet containing the hard-facing particles.

The choice of a particular brazing alloy will, of course, depend upon the substrate to which the hard-facing composition is to be employed. Representative brazing alloys are given in the following table:

Al ALLOYS

| Brazing Alloy | Composition | Melting Range, °F |
|---|---|---|
| BAlSi-2 | 7.5Si,Bal.Al | 1070 to 1135 |
| BAlSi-3 | 10Si,4Cu, Bal.Al | 970 to 1085 |
| BAlSi-4 | 12Si,Bal.Al | 1070 to 1080 |
| BAlSi-5 | 10Si,Bal.Al | 1070 to 1095 |

STAINLESS STEELS, LOW CARBON STEELS

| Brazing Alloy | Composition | Brazing range,°F |
|---|---|---|
| BAg-1 | 45Ag,15Cu,16Zn,24Cd | 1145 to 1400 |
| BAg-1a | 50Ag,15.5Cu,16.5Zn,18Cd | 1175 to 1400 |
| BAg-3 | 50Ag,15.5Cu,15.5Zn,16Cd,3Ni | 1270 to 1500 |
| BAg-7 | 56Ag,22Cu,17Zn,5Sn | 1205 to 1400 |
| BAg-13 | 54Ag,5Zn,1Ni,40Cu | 1575 to 1775 |
| BAg-18 | 60AG,10Sn,30Cu | 1325 to 1550 |
| BAg-19 | 92.5Ag,0.2Li,Bal.Cu | 1610 to 1800 |
| BNi-1 | 14Cr,4Si,3.5B,4.5Fe,0.75C,Bal.Ni | 1950 to 2200 |
| BNi-3 | 4.5Si,3.1B,1.5Max.Fe,Bal.Ni | 1850 to 2150 |
| BNi-7 | 13Cr,10P,Bal. | |

Al ALLOYS -Continued

| Brazing Alloy | Composition | Melting Range, °F |
|---|---|---|
| | Ni | 1700 to 1900 |
| BCu-1 | 99.90 misc.Cu | 2000 to 2100 |
| BAu-4 | 81.5Au,Bal.Ni | 1740 to 1840 |

COPPER AND COPPER ALLOYS

| Brazing Alloy | Composition | Melting range, °F |
|---|---|---|
| RBCuZn-A | 59.25Cu,40Zn,0.75Sn | 1630 to 1650 |
| RBCuZn-D | 48Cu,42Zn,10Ni | 1690 to 1715 |
| BCuP-1 | 95Cu,5P | 1310 to 1650 |
| BCuP-2 | 92.75Cu,7.25P | 1310 to 1460 |
| BCuP-4 | 6Ag,86.75Cu,7.25P | 1190 to 1335 |
| BCuP-5 | 15Ag,80Cu,5P | 1190 to 1475 |

The two sheets or strips, one containing the hard-facing powder and the other containing the brazing alloy are then laminated together by means of light rolling on a heated surface, typically at 275° to 325°F. At this stage, each of the sheets has a particle content of from 40 to 80% by volume, the remainder being the PTFE and void spaces. This composite sheet can then be trimmed by cutting with a scissors into the shape desired for application to the substrate.

Figure 3:
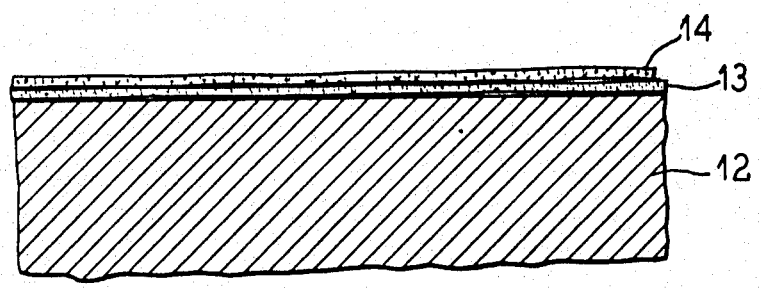
FIG. 3 is a fragmentary cross-sectional view of the laminate after application to the substrate.

FIG. 3 illustrates the composite sheet after its application to a substrate 12. The composite consists of a sheet 13 composed of fibrillated PTFE containing hard-facing particles and a sheet 14 containing the brazing alloy particles. It seems to make little difference whether the sheet containing the hard-facing particles or the brazing alloy particles is placed next to the substrate. The composite sheet may be secured to the substrate by means of a temporary cement.

Figure 4:
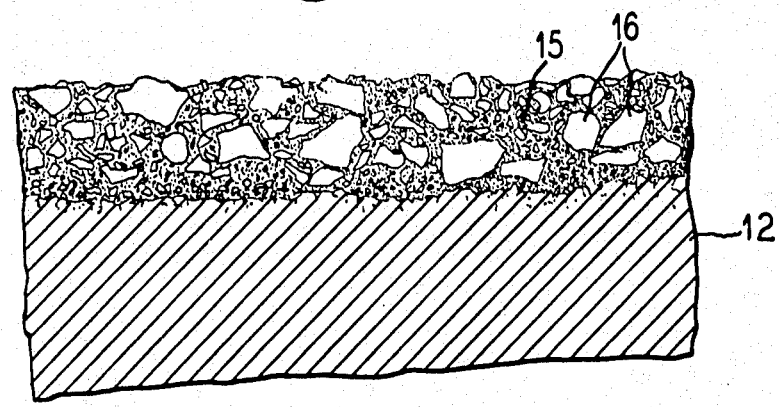
FIG. 4 is a highly magnified view of the microstructure of a coating produced according to the process of the present invention.

The substrate with the composite sheet attached thereto is then subjected to a brazing temperature appropriate to the brazing alloy being used. In reaching the brazing temperature, the PTFE is volatilized early in the brazing cycle, as is any brazing cement present. The molten braze material infiltrates the hard-facing particles, leaving a continuous matrix of brazed material 15 in which the discrete particles of hard-facing material 16 are confined (see FIG. 4). The total thickness of the brazed coating should be at least about 0.005 inch and may be as high as 0.150 inch. The final coating on the surface of the substrate is a substantially 100% dense coat typically consisting of 80 to 85% hard-face particles and 15 to 20% brazing material.

The use of the composite sheets permits the hard particle sheets to be processed to a higher initial density or hard particle content as compared with combining hard particles and brazing powders into the same sheet, in which case, the sheet is limited to a lower density range depending on the volume of braze material used.

The brazing itself may be performed by conventional torch heating, furnace heating, resistance heating or induction heating. Furnace heating is generally preferred in a vacuum or a reducing or neutral atmosphere to prevent oxidation of the substrate. Brazing by resistance heating has the advantage of rapid heating, minimum cycle time which minimizes exposure of the component to high temperature and reduces any tendency of the molten braze material to dissolve or alter the chemical or physical makeup of the hard-facing particles.

To illustrate a specific example, a 50 gram sample of chromium carbide powder was mixed with 0.75 grams of No. 6 extrusion grade Teflon and blended in a Waring blender with sufficient mineral spirits to form a liquid slurry. The mixing was continued for 2 minutes. The blended slurry was then transferred to a Buchner funnel to separate the solids from the liquid. The solids were further dried on a hot plate at a temperature of 275° to 325°F. The solid material was then subjected to rolling pressure, folding, cross-rolling and refolding, spraying mineral spirits as needed to maintain workability. The rolling and cross-folding formed a network of Teflon filaments which served to hold the particulate material in place and provided a handleable clothlike mat. This mat had a density of 65% of theoretical and a thickness of 0.030 inch. A nickel brazing alloy sheet was made up to the same sheet thickness and containing substantially the same amount of metal particles as the chromium carbide mats. The two mats were laminated together under slight rolling pressure at slightly elevated temperatures. They were applied to a nickel superalloy base and then heated to a brazing temperature. During the braze cycle, the brazing alloy in the molten state infiltrated the hard particle mat, filling the interstices and forming a coating on the substrate consisting of hard particles in a matrix of the brazing alloy. The Teflon volatilized early in the brazing cycle.

Wear tests were conducted to compare the hard-face coatings applied by this process with coatings applied by conventional processes. It was found that the coating produced according to the present invention exhibited a loss of 0.0012 inch after a test period of 20 hours, which is comparable to coatings applied by other processes.

Oxidation-diffusion tests were conducted up to a maximum of 500 hours exposure at 1,700°F in air. Visual examinations revealed little damage except for a superficial oxide coating on the surface. Metallographic examination showed no evidence of oxygen penetration. The specimen was recrystallized as a result of the temperature exposure, but showed no other damage.

It should be evident that various modifications can be made to the described embodiments without departing from the scope of the present invention.

I claim as my invention:

1. The method of applying a hard facing to a substrate which comprises applying to the surface of said substrate a laminate comprising a mat of biaxially oriented polytetrafluoroethylene fibers containing particles of a hard-facing material bonded to a mat of biaxially oriented polytetrafluoroethylene fibers containing particles of a brazing alloy, and heating the laminate to a brazing temperature at which said brazing alloy melts, to thereby volatilize said polytetrafluoroethylene and form a coating containing said particles of hard-facing material in a matrix of brazing alloy bonded to said substrate.

2. The method of claim 1 in which the hard-facing material constitutes from 40 to 80% by volume of the mat in which it is included.

3. The method of claim 1 in which the brazing alloy constitutes from 40 to 80% by volume of the mat in which it is included.

4. The method of claim 1 in which said hard-facing material is chromium carbide.

5. The method of claim 1 in which said coating has a thickness in the range from about 0.005 to 0.150 inch.

6. The method of applying a hard facing to a substrate which comprises forming a pliable sheet of hard-facing material particles and powdered polytetrafluoroethylene, fibrillating the resulting sheet to form a biaxially oriented sheet, laminating the resulting sheet to a sheet of biaxially oriented polytetrafluoroethylene containing particles of a brazing alloy, applying the resulting laminate to said substrate, and heating the laminate to a brazing temperature at which said brazing alloy melts to thereby volatilize said polytetrafluoroethylene and form a coating containing said particles of hard-facing material in a matrix of brazing alloy bonded to said substrate.

7. The method of claim 6 in which said hard-facing material particles constitute from 40 to 80% by volume of the sheet in which they are included.

8. The method of claim 7 in which said hard-facing material is chromium carbide.

* * * * *

Disclaimer 3,876,447.—*Frank T. Lally*, Willowick, Ohio. METHOD OF APPLYING HARD-FACING MATERIALS. Patent dated Apr. 8, 1975. Disclaimer filed Nov. 22, 1976, by the assignee, *TRW Inc.*

Hereby enters this disclaimer to claims 1–10 of said patent.

[*Official Gazette February 1, 1977.*]